(12) United States Patent
Roper et al.

(10) Patent No.: US 9,976,815 B1
(45) Date of Patent: May 22, 2018

(54) HEAT EXCHANGERS MADE FROM ADDITIVELY MANUFACTURED SACRIFICIAL TEMPLATES

(71) Applicant: HRL LABORATORIES, LLC, Malibu, CA (US)

(72) Inventors: Christopher S. Roper, Santa Monica, CA (US); David Page, Malibu, CA (US); Randall C. Schubert, Malibu, CA (US); Christopher J. Ro, Malibu, CA (US); Arun Muley, San Pedro, CA (US); Charles Kusuda, Mukilteo, WA (US)

(73) Assignees: HRL Laboratories, LLC, Malibu, CA (US); The Boeing Company, Irvine, CA (US)

( * ) Notice: Subject to any disclaimer, the term of this patent is extended or adjusted under 35 U.S.C. 154(b) by 1129 days.

(21) Appl. No.: 14/185,665

(22) Filed: Feb. 20, 2014

(51) Int. Cl.
*F28F 1/10* (2006.01)
*B23P 15/26* (2006.01)
*B29D 28/00* (2006.01)

(52) U.S. Cl.
CPC ............... *F28F 1/10* (2013.01); *B23P 15/26* (2013.01); *B29D 28/00* (2013.01)

(58) Field of Classification Search
CPC ............ B29D 28/00; F28F 1/10; B23P 15/26
See application file for complete search history.

(56) References Cited

U.S. PATENT DOCUMENTS

| | | | | |
|---|---|---|---|---|
| 6,076,324 | A * | 6/2000 | Daily | B29C 67/0077 52/637 |
| 6,609,043 | B1 * | 8/2003 | Zoia | B29C 33/40 700/119 |
| 7,653,276 | B1 * | 1/2010 | Gross | F28D 20/023 385/46 |
| 8,320,727 | B1 * | 11/2012 | Jacobsen | B29D 11/00663 264/1.24 |
| 8,573,289 | B1 | 11/2013 | Roper et al. | |
| 2001/0025203 | A1 * | 9/2001 | Gervasi | B29C 67/0066 700/98 |
| 2004/0123980 | A1 * | 7/2004 | Queheillalt | C23C 14/046 165/133 |
| 2009/0321045 | A1 * | 12/2009 | Hernon | F28F 13/003 165/80.2 |
| 2010/0159398 | A1 * | 6/2010 | Rock | G03F 7/095 430/322 |
| 2012/0089238 | A1 * | 4/2012 | Kang | A61L 27/222 623/23.72 |

(Continued)

OTHER PUBLICATIONS

U.S. Appl. No. 13/618,616, Not yet published, Roper et al.

(Continued)

*Primary Examiner* — Jacob Cigna
(74) *Attorney, Agent, or Firm* — Lewis Roca Rothgerber Christie, LLP

(57) ABSTRACT

A method of manufacturing a heat exchanger including a heat exchanger core of a first material, the method including additive manufacturing a sacrificial scaffold of a second material, the sacrificial scaffold corresponding in shape to that of the heat exchanger core, coating the sacrificial scaffold with a layer of the first material, and removing the sacrificial scaffold to leave behind the heat exchanger core with an integrated self-aligned passage.

19 Claims, 8 Drawing Sheets

(56) References Cited

U.S. PATENT DOCUMENTS

| | | | | |
|---|---|---|---|---|
| 2013/0171019 | A1* | 7/2013 | Gessler | B29C 67/0051 419/2 |
| 2014/0014493 | A1* | 1/2014 | Ryan | B01J 19/30 203/89 |
| 2014/0251585 | A1* | 9/2014 | Kusuda | F28D 1/06 165/164 |

OTHER PUBLICATIONS

U.S. Appl. No. 13/786,367, Not yet published, Maloney et al.
U.S. Appl. No. 14/676,794, Not yet published, Roper et al.
Maloney, K.J. et al., Multifunctional Heat Exchangers Derived from Three-Dimensional Micro-Lattice Structures, International Journal of Heat and Mass Transfer, 2012, 8 pages.
Roper, C.S. et al., Scalable Three-Dimensional Bicontinuous Fluidic Networks: Polymer Heat Exchanges and Towards Artificial Organs, Supporting Information, Mar. 5, 2015, 1 page.
Roper, C.S. et al., Scalable 3D Bicontinuous Fluid Networks: Polymer Heat Exchangers Toward Artificial Organs, Advanced Materials, Mar. 5, 2015, 6 pages.
U.S. Appl. No. 14/185,665, Not yet published, Roper et al.
Roper, Christopher et al., Hollow Polymer Micro-Truss Structures Containing Pressurized Fluids, U.S. Appl. No. 13/618,616, filed Sep. 14, 2012, 27 pages.
Maloney, Kevin et al., Hollow Porous Materials With Architected Fluid Interfaces for Reduced Overall Pressure Loss, U.S. Appl. No. 13/786,367, filed Mar. 5, 2013, 24 pages.
Maloney, Kevin et al., Microlattices as architected thin films: Analysis of mechanical properties and high strain elastic recovery, AIP APL Materials 1, 022106 (2013), 9 pages.
Maloney, Kevin et al., Multifunctional heat exchangers derived from three-dimensional micro-lattice structures, International Journal of Heat and Mass Transfer, 55, 2486-2493 (2012).
Heat Exchanger, Heralding a New Era for Engineering Design, Aug. 2010, TCT Magazine, URL:http://www.within-lab.com/case-studies/index11.php, 2 pages.
3D Printing Additive Manufacturing Product Development, 2014, Rapid News Publications Ltd., URL: http://www.tctmagazine.com/locations/3t-rpd-ltd/, 2 pages.
Clark School Press Release Story: New 3D-Printed Plastic Heat Exchanger Shows Complex Geometries Are Possible from Additive Manufacturing, Press Release, Jan. 23, 2012, A. James Clark School of Engineering, http://www.eng.umd.edu/html/media/release.php?id=156, 2 pages.
CIPO Office Action for CA Patent Application No. 2,836,709, dated Feb. 10, 2015, 3 pages.
CIPO Office Action for CA Patent Application No. 2,836,709, dated Dec. 21, 2015, 3 pages.
EPO Examination and Search Report for EP Application No. 14157663.7, dated May 20, 2014, 5 pages.
EPO Examination Report for EP Application No. 14157663.7, dated Oct. 9, 2015, 4 pages.
USPTO Office Action for U.S. Appl. No. 13/785,973, dated Sep. 9, 2015, 9 pages.
USPTO Office Action for U.S. Appl. No. 13/785,973, dated Dec. 1, 2015, 15 pages.

* cited by examiner

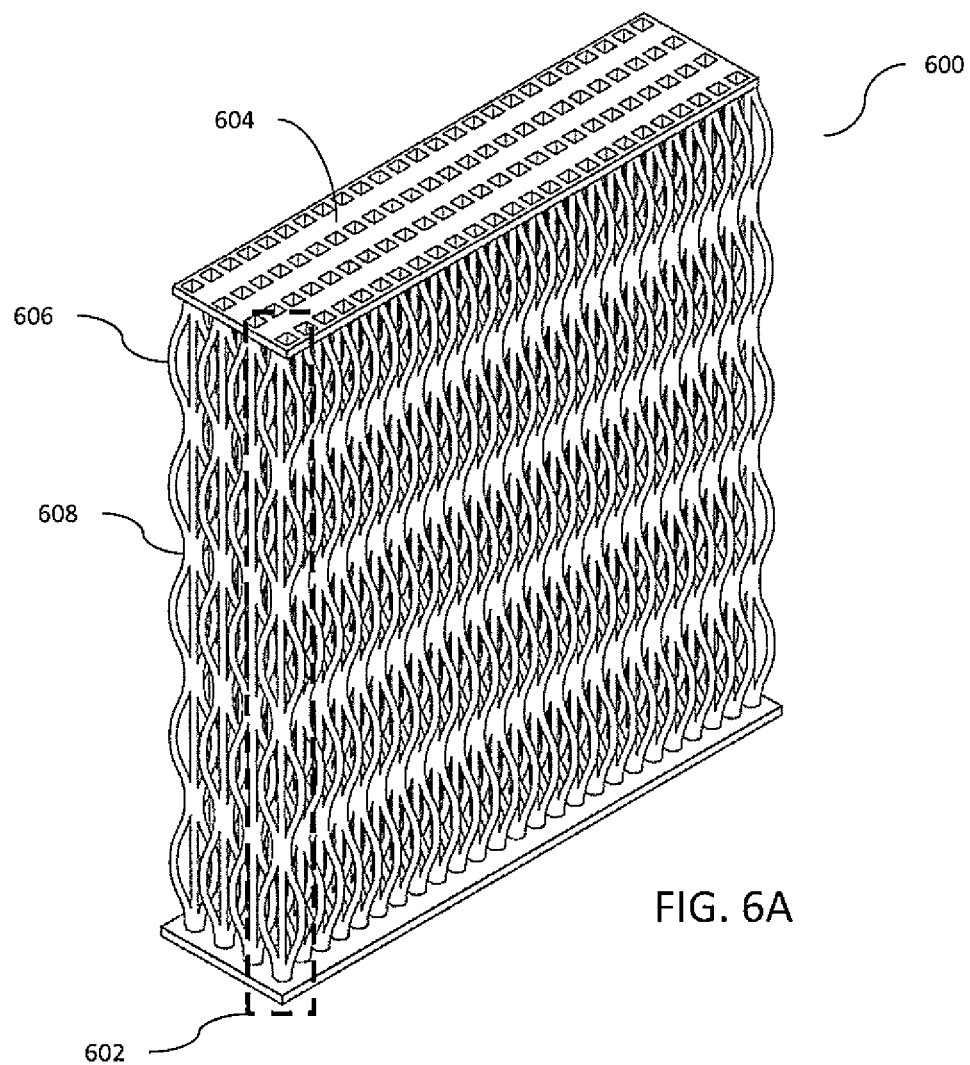
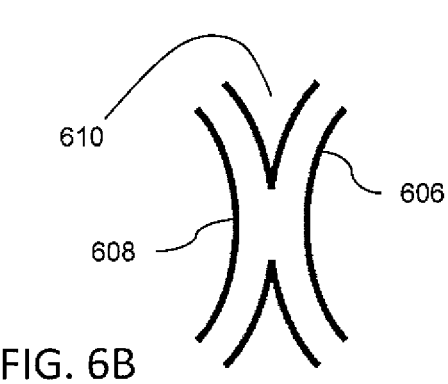
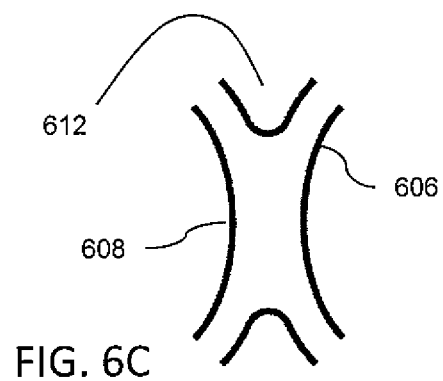

HEAT EXCHANGERS MADE FROM ADDITIVELY MANUFACTURED SACRIFICIAL TEMPLATES

CROSS-REFERENCE TO RELATED APPLICATION(S)

This application relates to U.S. patent application Ser. No. 12/506,014, filed on Jul. 20, 2009; U.S. patent application Ser. No. 13/618,616, filed on Sep. 14, 2012; and U.S. patent application Ser. No. 13/786,367, filed on Mar. 5, 2013, the entire contents of which are incorporated herein by reference.

FIELD OF THE INVENTION

The present invention relates to methods of manufacturing heat exchanging structures, and, more particularly, to methods for additively manufacturing heat exchangers, and heat exchanger structures manufactured thereby.

BACKGROUND

Traditional heat exchangers include plate-fin heat exchangers and shell-and-tube heat exchangers. Previous efforts to improve upon traditional heat exchangers involve altering the heat exchanger architecture so as to increase the heat transfer while having minimal effect on pumping power. Straight fins gave rise to a number of variations including staggered fins, wavy fins, offset fins, and louvered fins. Twisted tape inserts have been placed inside tubes in shell and tube heat exchangers. Elliptical tubes have also been used. However, these architectures are constrained by the shapes that can be easily fabricated. For example, it is difficult and sometimes impossible to combine the advantages of multiple individual heat transfer enhancement design features utilizing existing methods.

Additive manufacturing (e.g. 3D printing) enables significantly more complex designs than traditional heat exchanger fabrication techniques and allows for individual heat transfer enhancement features that can be combined into a complex design.

Additive manufacturing has been used to print heat exchangers by directly printing the heat exchanger walls. This method has several limitations stemming from the minimum feature size that may be printed. Thin walls are preferable in heat exchangers to reduce the conductive thermal resistance across the walls and thus increase heat transfer. In addition, thin walls permit more of the heat exchanger volume to be occupied by the heat transfer fluids, which keeps the ratio of actual to superficial velocity low, and reduces (e.g., minimizes) the input pumping power required to operate the heat exchanger. Typically, walls of traditional heat exchangers may be as thin as 90 microns and more compact heat exchangers could be made if thinner walls could be reliably produced at large scales. Typical 3D-printed minimum feature sizes are 50-100 microns. Making a 3D-printed heat exchanger with one or only a few voxels through the thickness of the wall leads to a high surface roughness (e.g., due to aliasing) and leaky walls, both of which make for poor heat exchangers. Some 3D printers exist with feature sizes in one dimension as small as 16 microns, but as feature size is reduced, production time increases superlinearly.

SUMMARY

Aspects of embodiments of the present invention are directed to transporting a maximum amount heat from one fluid stream to another fluid stream with reduced (e.g., minimal) pumping power expended to drive the fluid flow.

Aspects of embodiments of the present invention are directed to utilizing additive manufacturing (e.g. 3D printing) to fabricate a sacrificial scaffold, to utilizing conformal coating to create the heat exchanger walls around the sacrificial scaffold, and to then removing the scaffold, thus forming a heat exchanger.

According to embodiments of the present preset invention, there is provide a method of manufacturing a heat exchanger including a heat exchanger core of a first material, the method including: additive manufacturing a sacrificial scaffold of a second material, the sacrificial scaffold corresponding in shape to that of the heat exchanger core; coating the sacrificial scaffold with a layer of the first material; and removing the sacrificial scaffold to leave behind the heat exchanger core with an integrated self-aligned passage.

In one embodiment, the additive manufacturing includes one or more of fused deposition modeling (FDM), electron beam freeform fabricating ($EBF^3$), direct metal laser sintering (DMLS), electron beam melting (EBM), selective laser melting (SLM), selective heat sintering (SHS), selective laser sintering (SLS), plaster-based 3D printing (PP), laminated object manufacturing (LOM), stereo lithography (SLA) manufacturing, and digital light processing (DLP).

In one embodiment, the additive manufacturing of the sacrificial scaffold includes forming a first block, a second block, and a connection therebetween, the connection defining the passage.

In one embodiment, the first material includes one or more of metals, metal alloys, polymers, ceramics, and composites.

In one embodiment, the coating of the sacrificial scaffold includes one or more of electroless deposition, electroplating, chemical vapor deposition, vapor deposition, slurry coating and sintering, electrophoretic coating and sintering, plasma spraying, and dip coating.

In one embodiment, the removing of the sacrificial scaffold includes forming an opening through the layer of the first material for allowing access to the second material of the sacrificial scaffold.

In one embodiment, the removing of the sacrificial scaffold includes one or more of chemical etching, thermal depolymerizing, sublimating, vaporizing, and melting.

In one embodiment, the method of manufacturing the heat exchanger further includes strengthening the heat exchanger core by applying heat treatment.

In one embodiment, the method of manufacturing the heat exchanger further includes coupling headers to the heat exchanger core to form the heat exchanger.

In one embodiment, the diameter of a cross section of the passage is less than 1.5 mm.

According to embodiments of the present preset invention, there is provide a heat exchanger structure including: an inlet manifold; an outlet manifold; and a first passage, a second passage, and a third passage, each of the first, second, and third passages being configured to couple the inlet manifold and the outlet manifold, wherein each of the first, second, and third passages has a wavy pattern along a lengthwise direction of the first, second, and third passages and has a cross-sectional shape, the cross-sectional shape having a first line of symmetry corresponding to a major axis of the cross-sectional shape, and a second line of symmetry perpendicular to the first line of symmetry and corresponding to a minor axis of the cross-sectional shape.

In one embodiment, all of the cross-sectional shapes on a plane normal to the lengthwise direction have areas and shapes that are constant to within about 10%.

In one embodiment, the cross-sectional shapes on a plane normal to the wavy pattern at all point along the wavy pattern have areas and shapes that are constant to within about 10%.

In one embodiment, the cross-sectional shape has four quadrant splines defined by the first and second lines of symmetry, each quadrant spline having rotation symmetry about a midpoint of the quadrant spline.

In one embodiment, wherein the cross-sectional shape is a tapered ellipse.

In one embodiment, the minor axes of the first, second, and third passages are parallel, wherein the second passage is arranged between the first and third passages along a direction of the minor axis, and wherein for every point along a direction corresponding to a major axis of the cross-sectional shape, a summation of separations between the first and second passages and the second and third passages along a direction of the minor axis is within 10% of a median value.

In one embodiment, a length to height ratio of the cross-sectional shape is in a range of about 1.2:1 to about 10:1.

In one embodiment, a length to a height ratio of the cross-sectional shape is about 3:1 to about 4:1.

In one embodiment, a waviness amplitude to a waviness period ratio for each of the first and second passages is in a range of about 1:1 to about 1:10.

According to embodiments of the present preset invention, there is provide a heat exchanger structure including: an inlet manifold; an outlet manifold; and a first set of helices and a second set of helices, each of the first and second set of helices being configured to couple the inlet manifold and the outlet manifold, wherein each of the first and second set of helices include two or more individual helices having cross sections in shapes of ellipses.

In one embodiment, axes of the two or more individual helices are collinear to within about 5° and to within about 5% of a spacing between the first and second set of helices.

According to embodiments of the present preset invention, there is provide a heat exchanger structure including: an inlet manifold; an outlet manifold; a first wavy passage; a second wavy passage; a third wavy passage; and a fourth wavy passage, wherein the first, second, third, and fourth wavy passages connect at a plurality of nodes, and wherein a cross-sectional area of each node is within 20% of a sum of cross-sectional areas of the first, second, third, and fourth wavy passages.

In one embodiment, the plurality of nodes are collinear and periodically positioned along a length of the first, second, third, and fourth wavy passages.

BRIEF DESCRIPTION OF THE DRAWINGS

These and other features and advantages of the present invention will be better understood by reference to the following detailed description when considered in conjunction with the following drawings, in which like elements are referenced with like numerals. These drawings should not be construed as limiting the present invention, but are intended to be illustrative only.

FIG. 6A is a perspective view illustrating a heat exchanger core having an interconnected network of wavy passages fabricated utilizing the process of FIGS. 2A-2D, according to an illustrative embodiment of the present invention. FIGS. 6B and 6C are schematic drawings illustrating the pointed and round entrances and exits, respectively, at connection nodes of wavy passages of the heat exchanger core of FIG. 6A, according to illustrative embodiments of the present invention.

DETAILED DESCRIPTION

Figure 1:
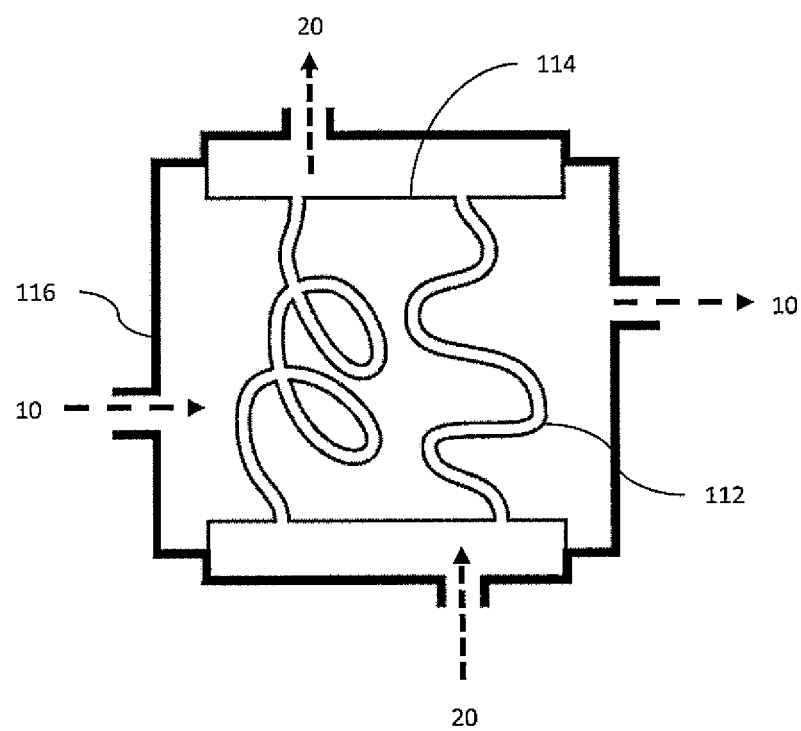
FIG. 1 is a schematic drawing illustrating a heat exchanger, according to an illustrative embodiment of the present invention.

The detailed description set forth below in connection with the appended drawings is intended as a description of illustrative embodiments of a system and method for manufacture of a heat exchanger in accordance with the present invention, and is not intended to represent the only forms in which the present invention may be implemented or utilized. The description sets forth the features of the present invention in connection with the illustrated embodiments. It is to be understood, however, that the same or equivalent functions and structures may be accomplished by different embodiments that are also intended to be encompassed within the spirit and scope of the present invention. As denoted elsewhere herein, like element numbers are intended to indicate like elements or features.

The present invention relates to methods of manufacturing heat exchangers from additively formed sacrificial templates, and example heat exchangers produced thereby.

The present invention overcomes the limitations of traditional heat exchanger enhancement techniques through the use of additive manufacturing. Additionally, the present invention overcomes many of the limitations of previous applications of additive manufacturing to heat exchangers. Embodiments of the present invention use additive manufacturing (e.g. 3D printing) to fabricate a sacrificial scaffold, use conformal coating to create the heat exchanger walls around the sacrificial scaffold, and then remove the scaffold, thus forming a heat exchanger.

By utilizing the additive manufacturing to make a sacrificial scaffold instead of directly making the heat exchanger walls, embodiment of the present invention enable additively manufactured heat exchangers that have passage sizes, rather than wall thicknesses, that are governed by the 3D printed voxel size. Thus, embodiments of the present invention may enable about 10 times smaller passages, about 10 times more compact structures, and more than 10 times higher heat transfer per unit volume as compared to previous efforts in 3D printed heat exchangers. Furthermore, the use of larger voxel sizes enhances (e.g., increases) the rate of production.

Embodiments of the present invention include polymer heat exchangers with thin walls, which facilitate heat transfer due to the reduced conductive thermal resistance of the thin polymer walls. Polymer heat exchangers may be well-suited in applications requiring reduced weight and reduced cost, and/or in applications requiring the handling of corrosive, reactive, and/or high purity fluids.

Embodiments of the present invention may further be used in a variety of applications including thermal management and environmental control systems, such as, precoolers, intercoolers (e.g., turbocharger intercoolers), engine coolant radiators, oil coolers (e.g., air-cooled and liquid-coolant-cooled oil coolers), condensers (e.g., air conditioning condensers), air conditioning evaporators, environmental control system (ECS) air conditioning packs, and/or the like.

FIG. 1 is a schematic drawing illustrating a heat exchanger 100, according to an illustrative embodiment of the present invention. In an embodiment, the heat exchanger 100 includes passages (e.g., internal passages) 112 for facilitating the flow of a fluid (e.g., a cooling fluid), tubesheets 114 for directing fluid (e.g., from/to an internal fluid inlet/outlet) to the passages 112, and headers 116 for encapsulating the passages 112 and tubesheets 114 and to facilitate the inflow and outflow of one or more fluids (e.g., coolants) into and out of the heat exchanger 100.

According to embodiments of the present invention, additive manufacturing is used to fabricate, utilizing a sacrificial material, a sacrificial scaffold including one or more inlet manifold features, one or more internal passage features, and one or more outlet manifold features. Each internal passage feature connects to one or more manifolds and/or one or more internal passage features. The inlet manifold, internal passages, and outlet manifold features may be solid volumes (e.g., not be open/hollow volumes) and define the fluid volume for an internal fluid 10 in the heat exchanger 100. The sacrificial scaffold is conformal coated by a coating material, and the coating defines the walls of the one or more passages 112 (e.g., tube walls) and the tubesheets 114. Because the walls of the one or more passages 112 and tubesheets 114 are created simultaneously by conformal coating a single mold, the tubesheets 114 are self-aligned to the one or more passages 112. The volume not occupied by the sacrificial scaffold and not occupied by the conformal coating may define the volume for an exterior fluid 20. After conformal coating, the sacrificial scaffold is selectively removed and headers 116 can be added to create a fully-functional heat exchanger 100.

FIGS. 2A-2E are schematic drawings illustrating the process of manufacturing a heat exchanger utilizing additive manufacturing and conformal coating, according to illustrative embodiments of the present invention. For clarity of illustration purposes, the example heat exchangers illustrated in FIGS. 2A-2E show a pair of passages, however, embodiments of the present invention may be practiced with one or more passages. For illustration purposes, the example heat exchangers illustrated in FIGS. 2A-2E show curved passages with loops, however, embodiments of the present invention are not limited thereto and may be implemented with passages having any or no curvature and/or any number of loops (e.g., no loops at all).

Figure 2A:
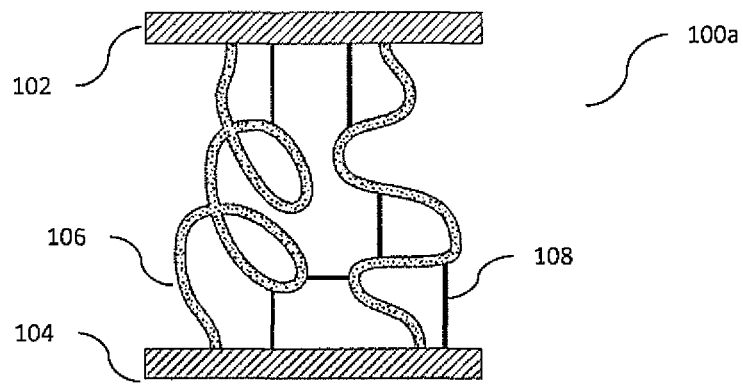
FIGS. 2A-2E are schematic drawings illustrating the process of manufacturing a heat exchanger utilizing additive manufacturing and conformal coating, according to illustrative embodiments of the present invention.

With reference to the embodiment illustrated in FIG. 2A, the process includes an act of utilizing additive manufacturing (e.g., 3D-printing) to make an initial sacrificial scaffold 100a. The sacrificial scaffold 100a and even the entire heat exchanger 100 may be designed with a computer program, which can generate a file that can be read by an additive manufacturing machine (e.g., 3D printer). The design may add mechanical support features to support the structure during the additive manufacturing process.

The additive manufacturing technique used may include one or more of fused deposition modeling (FDM), electron beam freeform fabricating ($EBF^3$), direct metal laser sintering (DMLS), electron beam melting (EBM), selective laser melting (SLM), selective heat sintering (SHS), selective laser sintering (SLS), plaster-based 3D printing (PP), laminated object manufacturing (LOM), stereolithography (SLA) manufacturing, and digital light processing (DLP), and photo-polymer waveguide fabrication methods (e.g. U.S. patent application Ser. No. 11/580,335, filed on Oct. 13, 2006, the entire content of which is incorporated herein by reference.

In an embodiment, the material used in additive manufacturing includes metals, polymers, ceramics, paper, fiber, and/or the like.

According to an embodiment, the sacrificial scaffold 100a includes an inlet-manifold-defining-feature (also referred to as an inlet manifold defining feature) 102, an outlet-manifold-defining-feature (also referred to as an outlet manifold defining feature) 104, and internal-passage-defining features 106 which together define the fluid volume for the internal fluid in the heat exchanger 100. The inlet and/or outlet manifold features 102/104 may be used to define only the tubesheets, or the entire header including the tubesheets. The latter approach may include a thicker feature to be additively manufactured than that of the former. The internal-passage-defining features (also referred to as passage-defining features) 106 may be solid, or may be hollow (e.g. if annular features are desired). The internal-passage-defining features 106 may include, for example, a bank of solid cylinders and/or a network of struts, which may have any cross-sectional shape including, for example, elliptical, airfoil, tapered, fluted, scalloped, finned, and/or like. In an embodiment, the cross-sectional shapes also vary with position in the heat exchanger core to form, for example, twisting elliptical cross sections on individual internal-passage-defining features 106. The passage-defining features 106 may also intersect, converge, diverge, and/or follow any path (e.g., straight, twisting, helical, tortuous, etc.) through the heat exchanger core. In an embodiment, no empty region within the heat exchanger core is completely enclosed by solid material, thus, all empty regions are accessible.

In an embodiment, the inlet manifold defining feature 102 is coupled to the internal-passage-defining features 106, which are coupled to the outlet manifold feature 104. A manifold defining feature 102/104 may be coupled to a single passage-defining feature 106 or multiple passage-defining features 106.

According to an embodiment, the interface between the passage-defining features 106 and the manifold defining features 102/104 are ideally tapered or radiused in order to reduce pressure loss due to sudden expansion or contraction.

In an embodiment of the present invention, the sacrificial scaffold 100a further includes one or more mechanical support features 108, which may be added to provide structural support to the sacrificial scaffold 100a during the additive manufacturing process.

Figure 2B:
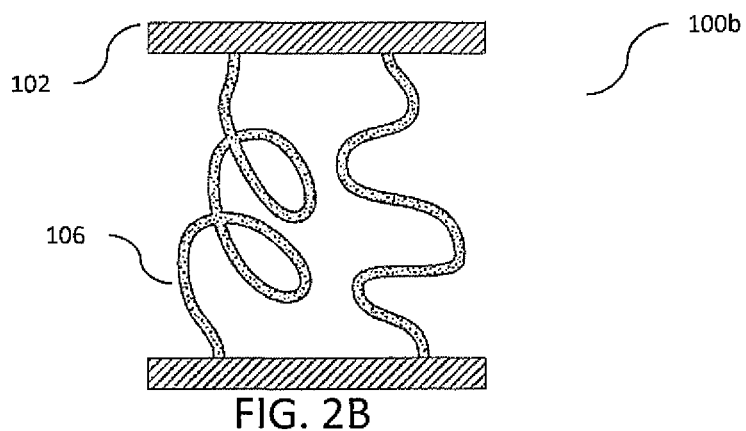

With reference to the embodiment illustrated in FIG. 2B, the process of manufacturing a heat exchanger 100 may further include post-processing the additively manufactured sacrificial scaffold 100a to produce the sacrificial scaffold 100b. The post-processing may include removing any existing mechanical support features 108 and/or altering the roughness of the walls of the passage-defining features 106.

Removing the one or more mechanical support features 108 may be performed mechanically, for example, through machining (such as drilling, milling, and/or the like), cutting, filing, and/or the like, or may be performed chemically, for example, through the use of appropriate solvents and/or chemical etching. Altering (e.g., smoothing) the roughness of walls of the passage-defining features 106 may include vapor polishing with an appropriate solvent and/or immersing the sacrificial scaffold 100a in an appropriate solvent.

According to an embodiment of the present invention, the process of manufacturing a heat exchanger 100 includes attaching one or more additional pieces of sacrificial material (e.g., sacrificial facesheets) to the initial sacrificial scaffold 100a/100b. For example, sacrificial facesheets could be added to extend the inlet and/or outlet defining manifolds 102/104, only a part of which may be manufactured via 3D-printing. This additional operation may allow for more efficient (e.g., less) use of the 3D-printing process by reserving the 3D-printing process for the complex features of the heat exchanger 100, such as, the passage-defining features 106, the interfaces between the passage-defining features 106 and the inlet/outlet defining manifolds 102/104, and only a part of the inlet/outlet defining manifolds 102/104. The sacrificial sheets may also couple multiple inlet manifold defining features 102 together and/or multiple outlet manifold defining features 104 together. According to an embodiment, the sacrificial sheets include the same sacrificial material as that used to additively manufacture the features 102, 104, and 106. However, the material used in the sacrificial sheets may also be different from that used in the features 102, 104, and 106.

Figure 2C:
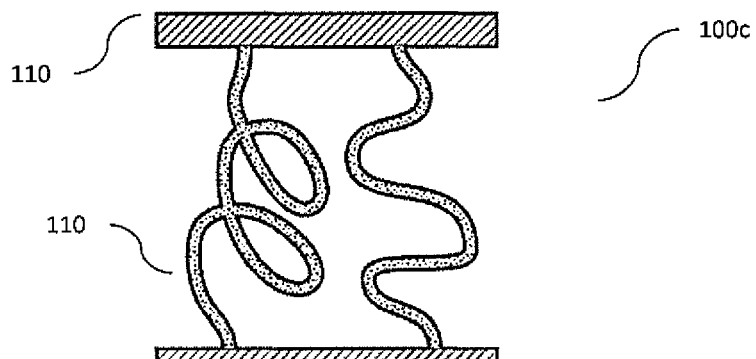

With reference to the embodiment illustrated in FIG. 2C, the process of manufacturing a heat exchanger 100 further includes conformally coating the sacrificial scaffold 100a/100b with another material to form a coated sacrificial scaffold 100c having a coating 110. The material of the coating 110 may include, for example, metals, metal alloys, polymers, ceramics, composites, and/or the like. Coating with metal or metal alloys may include one or more of electroless deposition, electroplating, chemical vapor deposition, physical vapor deposition (e.g., through sputtering or evaporation), slurry coating and sintering, electrophoretic coating and sintering, and plasma spraying. Coating with one or more polymers (e.g. parylene, such as, parylene-N, parylene-C, parylene AF-4, and/or the like) may include vapor deposition and/or dip coating. According to an embodiment, multiple coating materials are used, which may be deposited in a number of ways, for example, simultaneously, in a layered fashion, and/or the like. The coating 110 may be substantially uniform on all surfaces of the 3-D printed scaffold and may be substantially pin-hole free. The material of the sacrificial scaffold 100a/100b and the coating 110 are selected such that the sacrificial scaffold 100a/100b may be selectively removed from the coating. For example, in an embodiment in which chemical etching is used to remove the sacrificial material from the coating 110, the etchant may attack the sacrificial material faster (e.g., more than 8 times faster) than the coating material. In an embodiment, the coating 110 is self-supporting (e.g., can support its own weight without buckling) once the sacrificial material is removed, and forms a self-aligned tubesheet where each scaffold sheet meets the connections.

Figure 2D:
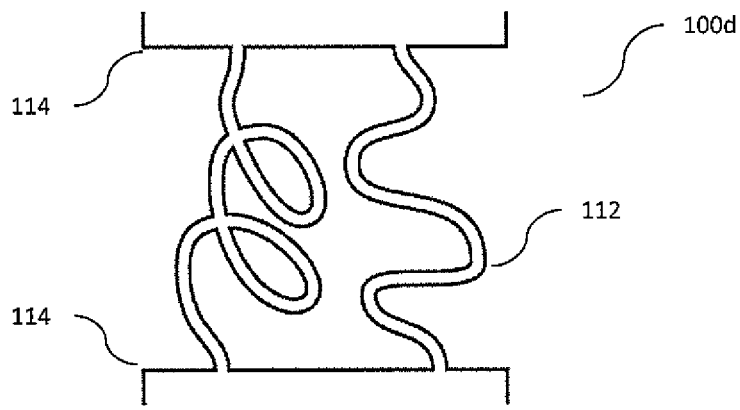

With reference to the embodiment illustrated in FIG. 2D, the process of manufacturing a heat exchanger 100 may further include removing the sacrificial scaffold 100a/100b and any existing sacrificial facesheet(s) to form a heat exchanger core 100d with passages 112 and integrated, self-aligned tubesheets 114. In an embodiment, one of more holes and/or slits are formed (e.g. cut) in the coating 110 to provide access to the sacrificial scaffold 100a/100b before the sacrificial scaffold 100a/100b can be removed. Removal of the sacrificial scaffold 100a/100b may be performed though one or more processes including chemical etching, thermal depolymerization, sublimation, vaporization (e.g., boiling), and/or burning.

Figure 2E:
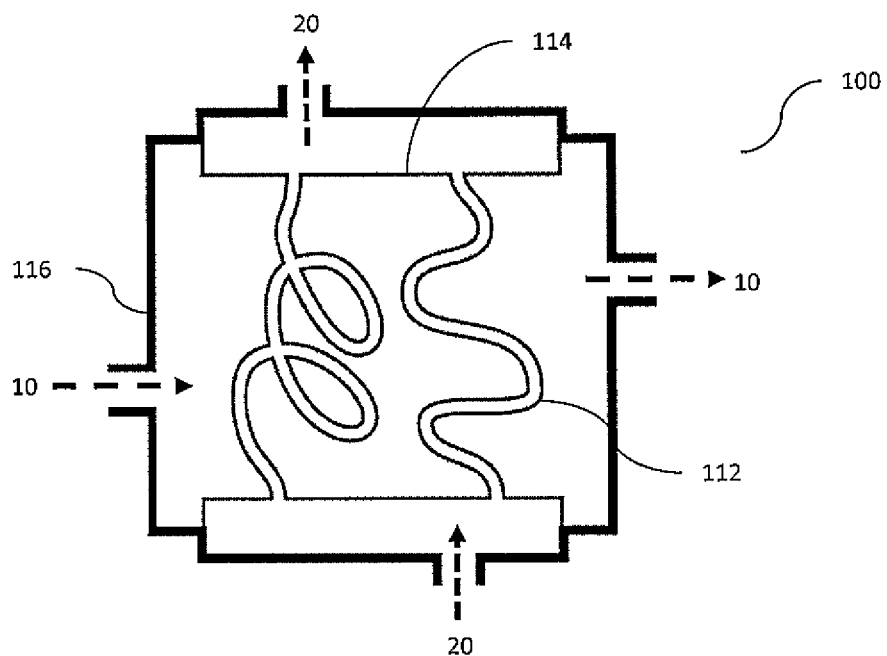

With reference to the embodiment illustrated in FIG. 2E, in an embodiment of the present invention, the process of manufacturing a heat exchanger 100 further includes coupling (e.g., attaching) the heat exchanger core 100d (including passages 112 and self-aligned tubesheets 114) to headers 116 thus forming a heat exchanger 100. In an embodiment, the headers 116 are formed through traditional forming and machining operations, which includes sheet metal fabrication, casting, computer numerical control (CNC) milling, and/or the like. However, in another embodiment, headers 116 are formed utilizing additive manufacturing in substantially the same manner as the heat exchanger core 100d. The coupling (e.g., attaching) of the headers 116 to the heat exchange core 100d may be performed through welding, soldering, brazing, adhesive bonding, and/or the like.

According to an embodiment of the present invention, the headers 116 are formed as part of the heat exchanger core 100d utilizing the processes outlined above with reference to FIGS. 2A-2D, thus, obviating the need for separately coupling the headers 116 to the heat exchanger core 100d as described above with respect to FIG. 2E.

Further, with reference to the embodiments illustrated in FIGS. 2D and 2E, according to an embodiment of the present invention, the process of manufacturing a heat exchanger 100 further includes applying heat treatment to the heat exchanger core 100d or the heat exchanger 100 to increase the strength of heat-treatable metal alloys.

In an embodiment of the present invention, the heat exchanger 100 created as described above is itself used as a sacrificial scaffold to form a replica heat exchanger in a different material (e.g., final material). For instance, a polymer heat exchanger may be used in an investment casting process to create a metal alloy heat exchanger. This process could be applied to the entire heat exchanger 100 (e.g., including headers 116) or only to the heat exchanger core 100d (with the headers 116 in the final material being later added).

Figure 3:
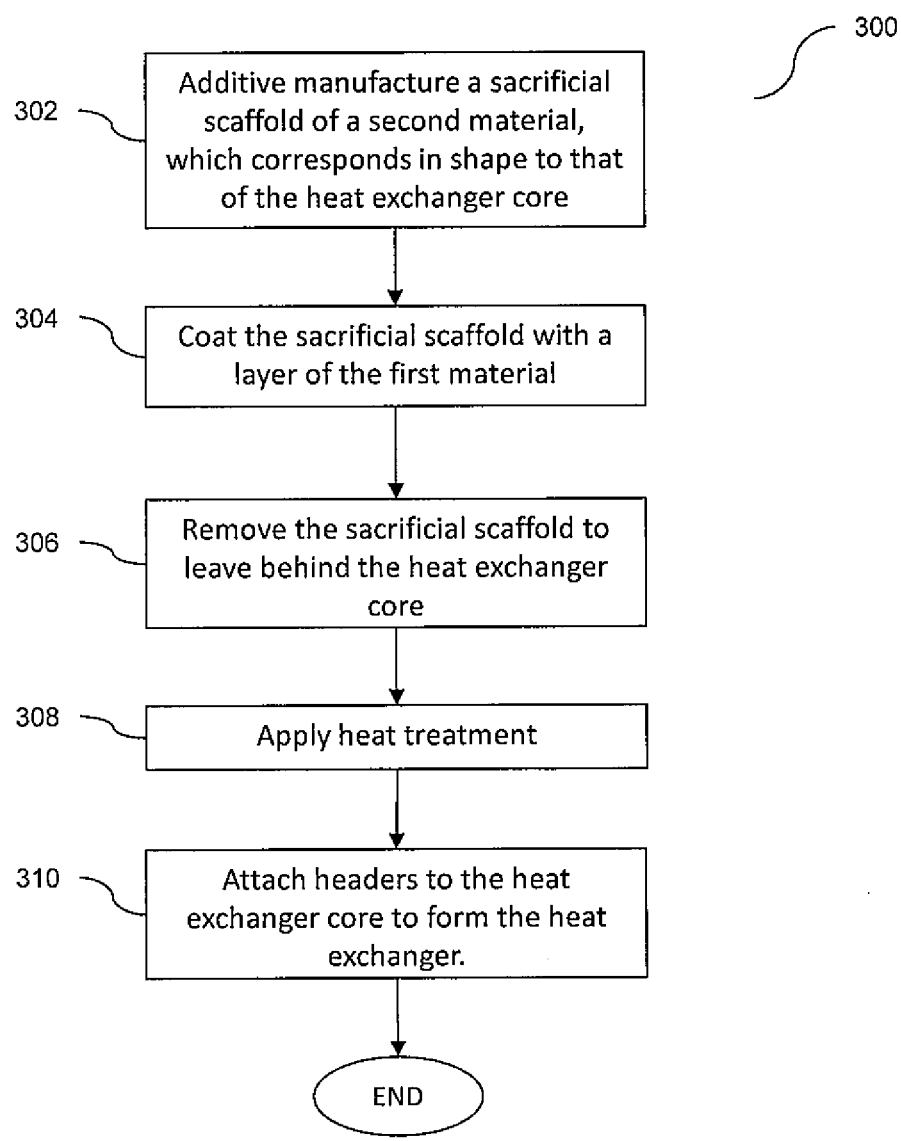
FIG. 3 is a flow diagram of a process for manufacturing a heat exchanger utilizing additive manufacturing and conformal coating, according to an illustrative embodiment of the present invention.

FIG. 3 is a flow diagram of a process 300 for manufacturing a heat exchanger 100 utilizing additive manufacturing and conformal coating with a first material (e.g., coating material), according to an illustrative embodiment of the present invention.

At act 302, an additive manufacturing machine (e.g., a 3D printer) is used to additive manufacture a sacrificial scaffold 100a of a second material (e.g., sacrificial material). The sacrificial scaffold 100a may correspond in shape to that of the heat exchanger core 100d.

In an embodiment, the sacrificial scaffold includes one or more mechanical support features 108 added to provide structural support to the sacrificial scaffold 100b during the additive manufacturing process. Upon completion of the additive manufacturing process, the one or more mechanical support features 108 may be removed mechanically or chemically.

The material (e.g., second material) of the sacrificial scaffold 100a/100b may include metals, polymers, ceramics, paper, fiber, and/or the like.

At act 304, the sacrificial scaffold 100a/100b is coated with a layer of the first material to form a coating 110. The first material may include, for example, metals, metal alloys, polymers, ceramics, composites, and/or the like. The first and second materials are chosen such that the second material may be selectively removed from the first material.

At act 306, the sacrificial scaffold 100a/100b is removed to leave behind the heat exchanger core 100d with one or more passages 112 and integrated self-aligned tubesheets 114. In an embodiment, one of more holes and/or slits are cut into the coating 110 to provide access to the sacrificial scaffold 100a/100b to facilitate the removal of the sacrificial scaffold 100a/100b utilizing a solvent.

In an embodiment of the present invention, at act 308, the heat exchanger core 100d is strengthened (e.g., made more rigid) by applying heat treatment. Whether or not act 308 is performed may depend on the intended application of the heat exchanger (e.g. if the heat exchanger 100 must withstand a heavy mechanical load or significant mechanical vibration) and on the coating material used (e.g., whether or not a heat-treatable polymer or metal alloy is used).

At act 310, headers 116 may be coupled (e.g., attached) to the heat exchanger core 100d to form the heat exchanger 100. The headers 116 encapsulate the heat exchanger core 100d and facilitate the inflow and outflow of one or more fluids (e.g., coolants) into and out of the heat exchanger 100 inside and/or around the passages 112. The headers 116 may be formed through traditional techniques (e.g., metal casting/milling techniques) or through additive manufacturing. In an embodiment, the headers 116 is formed, in acts 302-308, along with the heat exchanger core 100d as an integrated whole, thus eliminating the need for separate attachment of the header 116 in act 310.

Figure 4A:
FIGS. 4A-4D are schematic drawings illustrating a double-tapered elliptical-cross-section heat exchanger core fabricated utilizing the process of FIGS. 2A-2DF, according to an illustrative embodiment of the present invention.
Figure 4B:
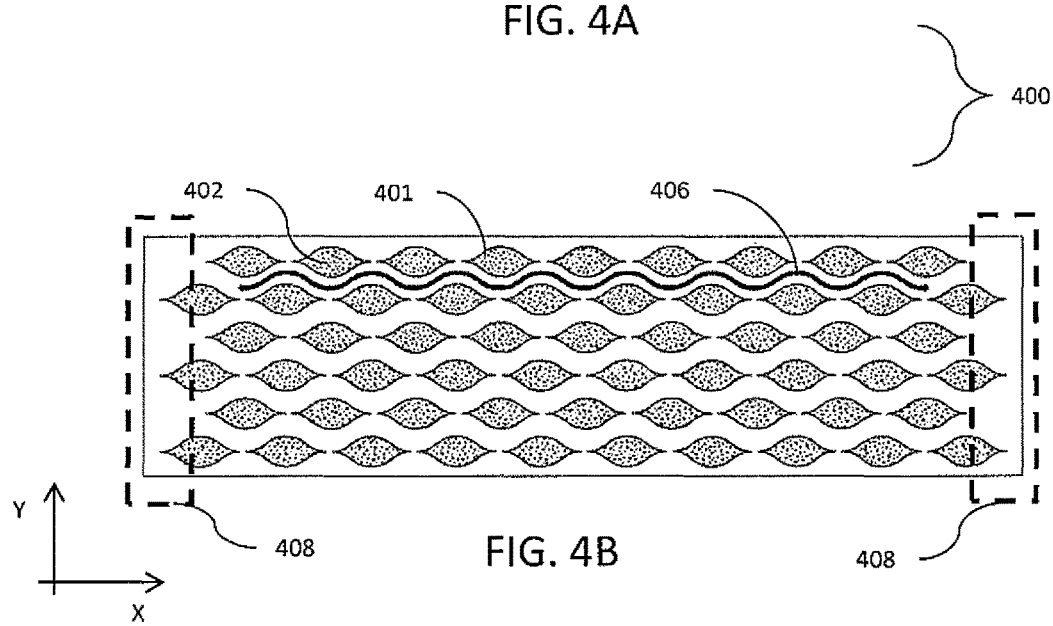
Figure 4C:
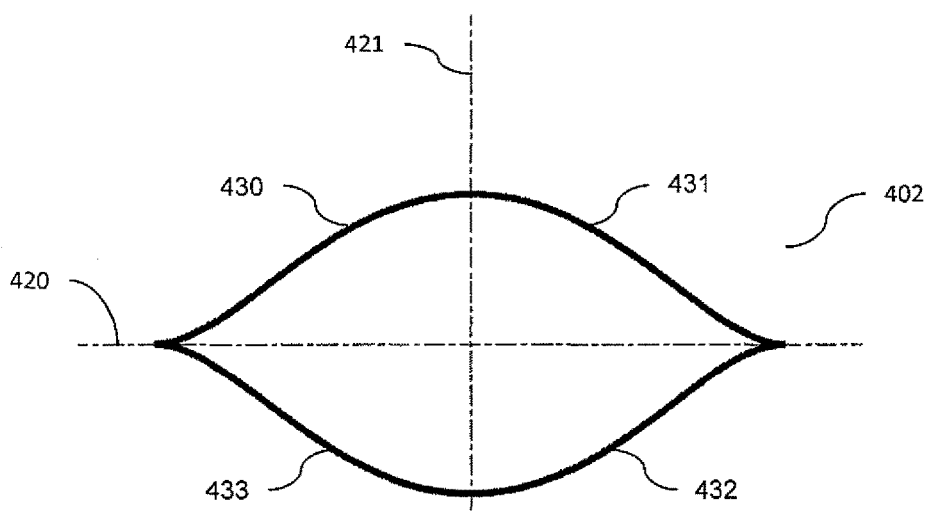
Figure 4D:
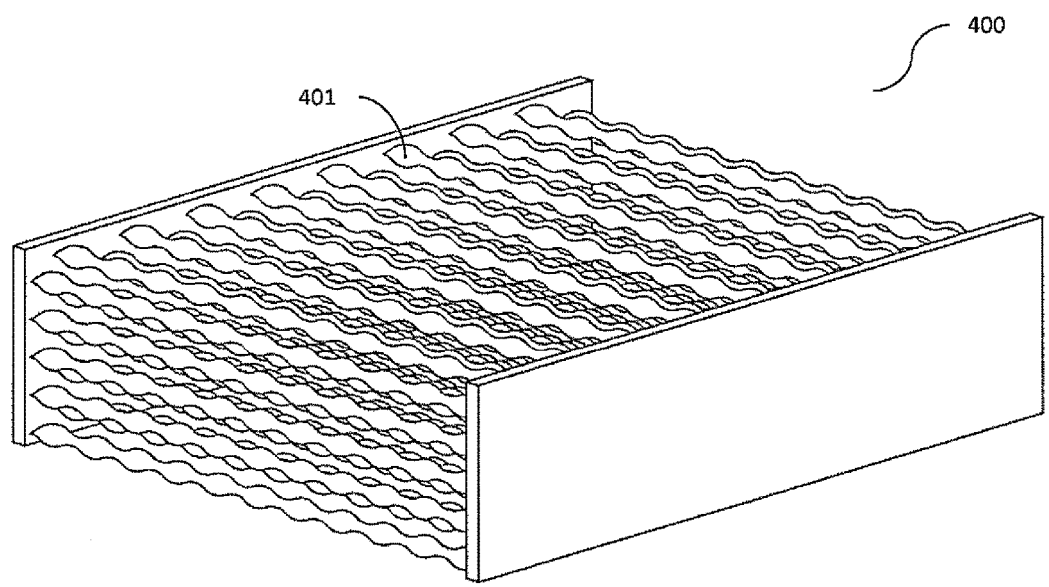

FIGS. 4A-4D are schematic drawings illustrating a double-tapered elliptical-cross-section heat exchanger core 400 fabricated utilizing the process of FIGS. 2A-2D, according to an illustrative embodiment of the present invention. FIG. 4A is a side view illustrating a single internal flow path through the double-tapered elliptical-cross-section heat exchanger core 400, according to an embodiment of the present invention. FIG. 4B is a top view illustrating the external flow paths through the double-tapered elliptical-cross-section heat exchanger core 400, according to an illustrative embodiment of the present invention. FIG. 4C is a cross-sectional view illustrating a cross-sectional shape of the passages 401, according to an embodiment of the present invention. FIG. 4D is an isometric view illustrating the double-tapered elliptical-cross-section heat exchanger core 400, according to an embodiment of the present invention. In FIG. 4C, the inlet and outlet manifolds are represented by sheets having a brick pattern, which do not demonstrate the inlet and outlet holes.

The heat exchanger core 400 includes two separate flow paths, each having features that promote heat transfer and promote reduced pressure drop. According to an embodiment, the passages 401, through which the internal fluid flows and around which the external flows, have a wavy pattern (e.g., a periodic wavy pattern), as, for example, illustrated in FIG. 4A. In one embodiment, the cross-sectional shape 402 of the passages 401 has a first line of symmetry 420 (e.g., corresponding to the major axis of the cross-sectional shape 402) and a second line of symmetry 421 crossing (e.g., perpendicular to) the first line of symmetry 420 (e.g., corresponding to the minor axis of the cross-sectional shape 402), as illustrated in FIG. 4C. As such, the cross-sectional shape 402 includes four splines (e.g., quadrant splines) 430-433, each spline existing in one of four quadrants defined by the two lines of symmetry 420 and 421. Each of the four splines 430-433 have rotational symmetry about a midpoint of the spline. For example the cross-sectional shape 402 of the passages 401 may be a tapered ellipse, as illustrated in FIGS. 4B and 4C.

In one embodiment, the cross-sectional shapes 402 on a plane normal to the wavy pattern (e.g., a plane defined by the X and Y axes illustrated in FIG. 4B) at all points along the wavy pattern is the same and have areas that are nearly the same (e.g., constant to within about 10%). In one example, all of the cross-sectional shapes 402 on a plane normal to the lengthwise direction of the passages 401 are the same and have areas that are nearly the same (e.g., constant to within about 10%).

According to an embodiment, the tapered elliptical cross-sectional shape 402 has a high aspect ratio, for example, the length-to-height ratio is about 1.2:1 to about 10:1. In one example, the length-to-height ratio is about 3.5:1. The high aspect ratio of the tapered elliptical cross-sectional shape 402 of the passages 401 reduces the fluid pressure drop as compared to tubes with circular cross sections, which, in turn, leads to improved (e.g., higher) heat transfer through the passages 401 as compared to tubes with circular cross sections. The tapered elliptical cross-sectional shape 402 in the direction of fluid may reduce the pressure drop through the passages 401 by streamlining the ellipse in the fluid flow direction.

In an embodiment, the cross-sectional shape 402 is single-tapered (e.g., tapered on only one side along the major axis of the ellipse). In another embodiment, the cross-sectional shape 402 is double-tapered (e.g., tapered on both ends along the major axis of the ellipse), as shown in FIG. 4B.

According to an embodiment, the passages 401 are arranged in a manner such that, with the exception of the entrance and exit regions 408, where an external fluid may flow into or out of the heat exchanger core 400, all cross section planes normal to the major axis of the tapered ellipses define areas outside of the passages 401 (e.g., between adjacent passages 401) that are the same (to within 10%) for any such cross section plane. In other words, for every point along a direction corresponding to a major axis of the cross-sectional shape 402, but not within the entrance and exit regions 408, a summation of separations between adjacent passages 401 along a direction of the minor axis (e.g., a direction normal to the lengthwise direction of the passage 401 and normal to the major axis) of the tapered ellipses is within 10% of a median value. In some examples, the summation of separations is within 5% or 2.5% of a median value.

In an embodiment, one or more of the internal flow path (e.g., fluid path through the passages 401) 404 and the external flow path (e.g., fluid path outside and around the passages 401) 406 are wavy. For example, the waviness of the external flow path 406 is produced by flow around the tapered ellipses 402. The waviness amplitude-to-period ratio may be matched with the tapered ellipse 402 aspect ratio for constriction-free flow paths. However, for flow paths with constrictions, the waviness amplitude-to-period ratio can vary from about 1:1 to about 1:10. Internal flow path 404 waviness may be produced by waviness introduced along the length of individual passages 401. Waviness amplitude-to-period ratio of the internal flow path 404 may be matched with the tapered ellipse 402 aspect ratio. The waviness in both fluid streams may promote fluid mixing in both fluids separately, increasing overall heat transfer performance of the heat exchanger core 400.

According to an embodiment of the present invention, the passages 401 is arranged such that the cross section for the external flow path 406 is approximately or about constant (e.g., constant). For example, if the periodicity of the arrangement of the passages 401 along the X direction (which corresponds in direction to the major axis of the cross-sectional shape 402) is equal to the length of the cross-sectional shape 402 along the X direction, and the periodicity of the arrangement of the passages 401 along the Y direction (which corresponds in direction to the minor axis of the cross-sectional shape 402) is equal to the width of the cross-sectional shape 402 along the Y direction, then the external flow path 406 may have a constant cross section.

According to an embodiment, both the internal and external flow paths 404/406 have constant cross-sectional areas, which reduces (e.g., eliminates) fluid pressure drop due to flow constriction or expansion. Lowering pressure loss associated with expansion and contraction may lead to higher efficiency use of kinetic energy to promote heat transfer.

Figure 5A:
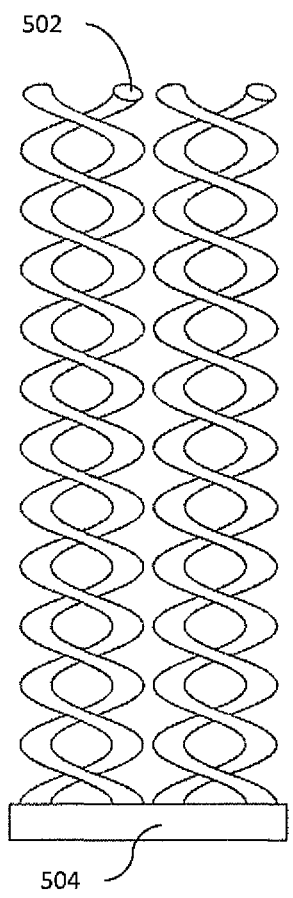
FIGS. 5A-5B are three-dimensional renderings illustrating a helical elliptical heat exchanger core fabricated utilizing the process of FIGS. 2A-2D, according to an illustrative embodiment of the present invention.
Figure 5B:
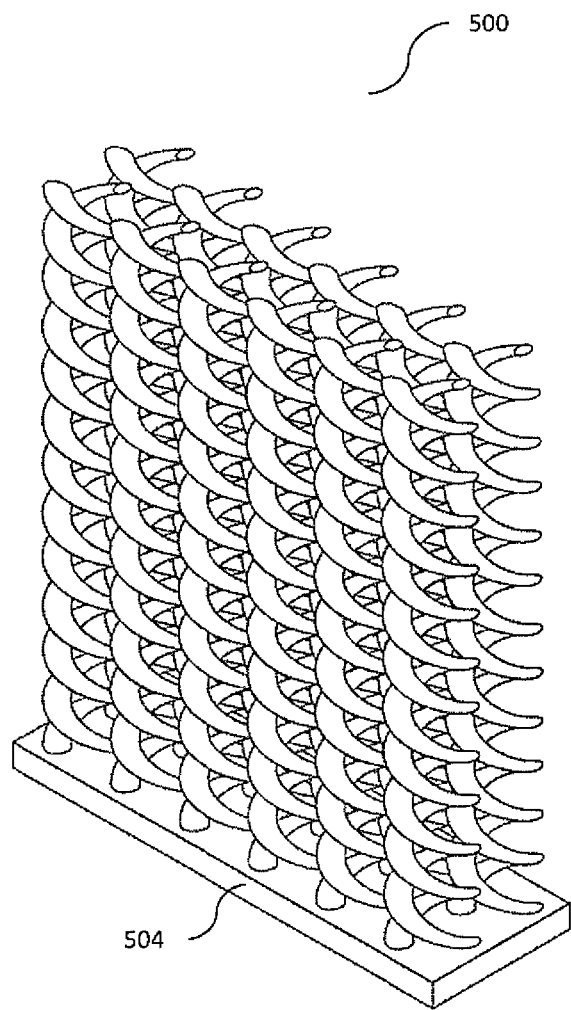

FIGS. 5A-5B are three-dimensional renderings illustrating a helical elliptical heat exchanger core (e.g., a double-helix cross-flow heat exchanger core) 500 fabricated utilizing the process of FIGS. 2A-2D, according to an illustrative embodiment of the present invention. FIG. 5A is a side view illustrating the helical elliptical heat exchanger core 500, according to an embodiment of the present invention. FIG. 5B is an isometric view illustrating the helical elliptical heat exchanger core 500, according to an embodiment of the present invention. For clarity of illustration, only one of the inlet and outlet manifolds (e.g., tubesheets) 504 has been shown in FIGS. 5A and 5B.

According to an embodiment of the present invention, one fluid volume flows through the helical coils (or passages) 502 and the second fluid volume passes around the helical coils 502 exchanging heat at the interface between them. According to an embodiment, the heat exchanger core 500 includes a double helix structure, as shown in FIGS. 5A and 5B. The helical coil structure may offer a higher heat transfer rate as compared to straight tubes, and the double helix structure may further improve (e.g., increases) heat transfer due to the compactness of its structure.

The curvature of the helical coils 502 acts to impose a centrifugal force on the fluid motion, generating secondary flow at multiple length scales. This secondary swirling flow may increase heat transfer as the strength and mixing intensity increases. The helical vortices formed in the helical coils 502 may delay transition from laminar to turbulent regimes, thus reducing the pressure drop through the helical coils 502, as compared to straight tubes. Further, the elliptical cross section of the helical coils 502 may reduce the pressure drop in the cross-flow (e.g., the flow around the helical coils 502) direction over a circular cross section as elliptical shapes have roughly a factor of two reduction in drag coefficient over a circular shape at varying Reynolds number.

According to an embodiment, the double-helix cross-flow heat exchanger core 500 has a high aspect ratio elliptical cross section. The ratio of major diameter to minor diameter of the elliptical cross section may be about 1:1 to about 1:10. In one example, the aspect ratio may be 3:1.

In an embodiment, the axes of individual helical coils (e.g., the helical coils of a double-helix) 502 are collinear to within about 5° and to within about 5% of a spacing between a first and a second set of helical coils 502 (e.g., a first and a second pair of double-helical coils 502).

According to embodiments of the present invention, the heat exchanger core 500 includes a single, double, triple, quadruple, or higher order helix pattern. The multi-helices may be arranged in a square, rectangular, triangular, or the like, array.

In an embodiment of the present invention, the helical coils 502 are compressed when the heat exchanger is not in use, thus enabling a deployable heat exchanger.

FIG. 6A is a perspective view illustrating a heat exchanger core 600 having an interconnected network of wavy passages fabricated utilizing the process of FIGS. 2A-2D, according to an illustrative embodiment of the present invention. FIGS. 6B and 6C are schematic drawings illustrating the pointed entrances and exits 610 and round entrances and exits 612, respectively, at connection nodes 608 of wavy passages 606 of the heat exchanger core of FIG. 6A, according to embodiments of the present invention.

The heat exchanger core 600 may include one or more strands 602 arranged in parallel between an inlet and outlet manifolds (e.g., tubesheets) 604, each strand 602 including, two or more wavy passages 606 that are interconnected at connection nodes (e.g., connection points) 608. In one example, each strand 602 includes four wavy passages 606, as shown in FIG. 6. The connection nodes 608 may be collinear along the length of the strands 602.

According to an embodiment, one fluid flows through the interconnected wavy-passage network while another fluid flows around the connected network exchanging heat at the interface between them. Wavy passages (e.g., channels) 606 may improve (e.g., increase) heat transfer by disrupting a boundary layer, which may develop in a flowing fluid. By connecting a network of such passages mixing is allowed to occur at connection nodes 608 where the wavy passages 606 meet, further enhancing (e.g., increasing) heat transfer and reducing the internal fluid's temperature gradient.

In some examples, the cross section of the wavy passages 606 may be circular or elliptical. However, embodiments of the present invention are not limited thereto and other cross-sectional shapes may be possible.

According to an embodiment of the present invention, the area of the connection nodes 608 is within 20% (and in an example, within 10%) of the sum of cross-sectional areas of the wavy passages 606 that meet at the node, which yields a nearly constant internal flow area and reduces (e.g., eliminates) the pressure drop associated with expanding and contracting flows. The connection nodes 608 may also provide mechanical support for the wavy passages 606 inside the heat exchange core. In an embodiment, the connection nodes 608 include pointed entrances and exits 610 (as shown in FIG. 6B) and/or rounded entrances and exits 612 (as shown in FIG. 6C) at the passage connection locations. The pointed entrances and exits 610 may reduce (e.g., eliminate) internal stagnation points for flow entering a passage connection nodes 608 and, thus, reduce fluid flow pressure loss. The pointed entrances and exits 610 may further delay the onset of flow separation and vortex shedding for flow leaving a passage connection location and, thus, further reduce fluid flow pressure loss.

According to an embodiment, the connection nodes 608 are arranged in a pattern (e.g., a periodic pattern). In one example, the pattern is a rectangular prism with the external flow oriented normal to (or perpendicular to) the two long sides of the rectangles.

In an embodiment, the manifolds 604 do not have a constriction compared to flow inside the passages. Further, fillets at the connections to the manifold 604 smoothly transition the cross-sectional area from inside the passages to inside the header, thus providing reduced pressure drop at entrance and exit of heat exchanger compared to abrupt transitions.

As recognized by a person of ordinary skill in the art, the design of any of the heat exchangers illustrated in FIGS. 4-6, can be repeated in one, two, or three axes to form a larger heat exchanger. Characteristic dimensions of the repeat units (e.g. aspect ratios, diameters, slenderness, cross-sectional shape, and/or the like) of these heat exchangers can be scaled to tune the fluid and heat transfer response of the heat exchangers. Additionally, the heat exchangers may be readily applied in the cross-flow configuration. However, with more complex (e.g., slightly more complex) manifolding, the heat exchangers could be applied in a co-current or counter-current configuration as well. Furthermore, baffles may be added (either in the additive manufacturing process or afterward) to create multiple passes on the external flow side. Multiple passes on the internal flow side are also possible and may be enabled by more complex manifolds and/or during the design of the sacrificial scaffold.

The present invention is not to be limited in scope by the specific embodiments described herein. Indeed, other various embodiments of and modifications to the present invention, in addition to those described herein, will be apparent to those of ordinary skill in the art from the foregoing description and accompanying drawings. Thus, such other embodiments and modifications are intended to fall within the scope of the present invention. Further, although the present invention has been described herein in the context of a particular implementation in a particular environment for a particular purpose, those of ordinary skill in the art will recognize that its usefulness is not limited thereto and that the present invention may be beneficially implemented in any number of environments for any number of purposes. Accordingly, the claims set forth below should be construed in view of the full breadth and spirit of the present invention as described herein and equivalents thereof.

What is claimed is:

1. A method of manufacturing a heat exchanger core of a first material, the method comprising:
    additive manufacturing a sacrificial scaffold of a second material, the sacrificial scaffold comprising a first manifold feature, a second manifold feature, and a curved passage feature extending along a curved pathway connecting the first and second manifold features, the sacrificial scaffold corresponding in shape to that of the heat exchanger core;
    coating the sacrificial scaffold with a layer of the first material; and
    removing the sacrificial scaffold to leave behind the heat exchanger core, the heat exchanger core comprising first and second tubesheets corresponding to the first and second manifold features, and further comprising a curved passage extending along the curved pathway and integrated with the first and second tubesheets and corresponding to the curved passage feature, the first and second tubesheets being concurrently formed with, and self-aligned to, the curved passage, in response to the removing the sacrificial scaffold,
    wherein a fluid path is formed through the first and second tubesheets and the curved passage.

2. The method of claim 1, wherein the additive manufacturing comprises one or more of fused deposition modeling (FDM), electron beam freeform fabricating (EBF³), direct metal laser sintering (DMLS), electron beam melting (EBM), selective laser melting (SLM), selective heat sintering (SHS), selective laser sintering (SLS), plaster-based 3D printing (PP), laminated object manufacturing (LOM), stereolithography (SLA) manufacturing, and digital light processing (DLP).

3. The method of claim 1, wherein the first material comprises one or more of metals, metal alloys, polymers, ceramics, and composites.

4. The method of claim 1, wherein the coating of the sacrificial scaffold comprises one or more of electroless deposition, electroplating, chemical vapor deposition, vapor deposition, slurry coating and sintering, electrophoretic coating and sintering, plasma spraying, and dip coating.

5. The method of claim 1, wherein the removing of the sacrificial scaffold comprises forming an opening through the layer of the first material for allowing access to the second material of the sacrificial scaffold.

6. The method of claim 1, wherein the removing of the sacrificial scaffold comprises one or more of chemical etching, thermal depolymerizing, sublimating, vaporizing, and melting.

7. The method of claim 1, further comprising strengthening the heat exchanger core by applying heat treatment.

8. The method of claim 1, wherein the passage has a circular cross section.

9. The method of claim 1, wherein the sacrificial scaffold further comprises one or more mechanical support features configured to structurally support the sacrificial scaffold during the additive manufacturing.

10. The method of claim 1, wherein the curved passage comprises a first set of helices and a second set of helices, each of the first and second set of helices being configured to couple an inlet manifold and an outlet manifold, and
    wherein each of the first and second set of helices comprise two or more individual helices having cross sections in shapes of ellipses.

11. The heat method of claim 10, wherein axes of the two or more individual helices are collinear to within about 5° and to within about 5% of a spacing between the first and second set of helices.

12. The method of claim 1, wherein the curved passage comprises:
    a first wavy passage;
    a second wavy passage;
    a third wavy passage; and
    a fourth wavy passage,
    wherein the first, second, third, and fourth wavy passages connect at a plurality of nodes, and
    wherein a cross-sectional area of each node is within 20% of a sum of cross-sectional areas of the first, second, third, and fourth wavy passages.

13. The method of claim 12, wherein the plurality of nodes are collinear and periodically positioned along a length of the first, second, third, and fourth wavy passages.

14. The method of claim 1, wherein the curved passage comprises a first passage, a second passage, and a third passage, each of the first, second, and third passages being configured to couple an inlet manifold and an outlet manifold, and
    wherein each of the first, second, and third passages has a wavy pattern along a lengthwise direction of the first, second, and third passages and has a shape in cross-section, the shape having a first line of symmetry corresponding to a major axis of the shape, and a second line of symmetry perpendicular to the first line of symmetry and corresponding to a minor axis of the shape.

15. The method of claim 14, wherein all shape of the heat exchanger core on planes normal to the lengthwise direction have areas varying by less than about 10% of a median value of the areas.

16. The method of claim 14, wherein the area of the cross-section varies by less than 10% of a median value of cross section areas.

17. The method of claim 14, wherein the shape has four quadrant splines defined by the first and second lines of symmetry, each quadrant spline having rotation symmetry about a midpoint of the quadrant spline.

18. The method of claim 14, wherein the shape is a tapered ellipse.

19. The method of claim 14, wherein minor axes of the first, second, and third passages are parallel,
   wherein the second passage is arranged between the first and third passages along a direction of the minor axis, and
   wherein for every point along a direction corresponding to a major axis of the shape, a summation of separations between the first and second passages and the second and third passages along a direction of the minor axis is within 10% of a median value.

\* \* \* \* \*